No. 678,014. Patented July 9, 1901.
E. H. MERRILL.
REMOVABLE VALVE SEAT.
(Application filed Nov. 24, 1900.)
(No Model.)
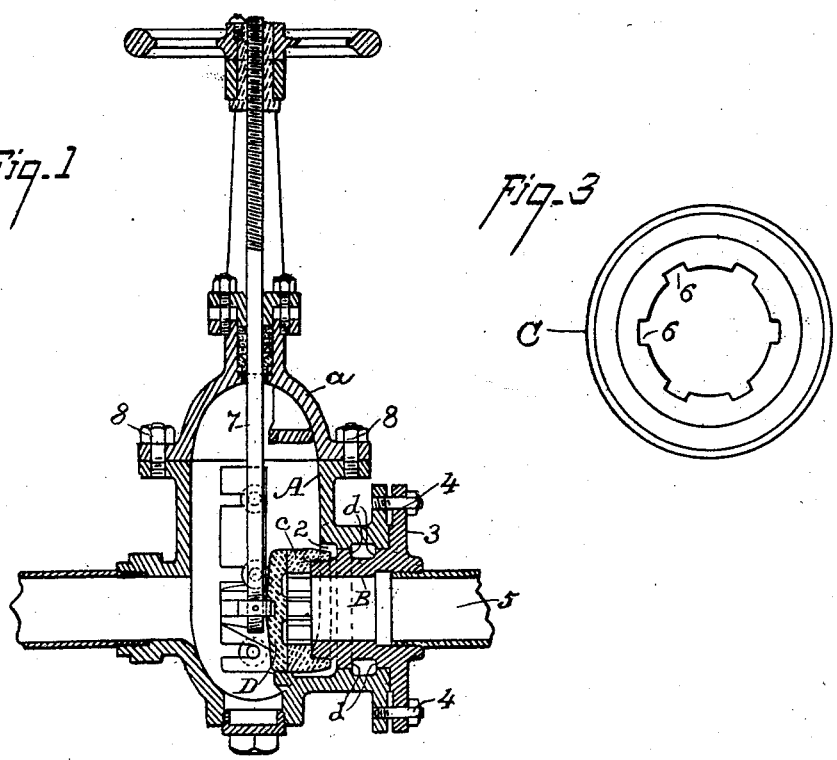
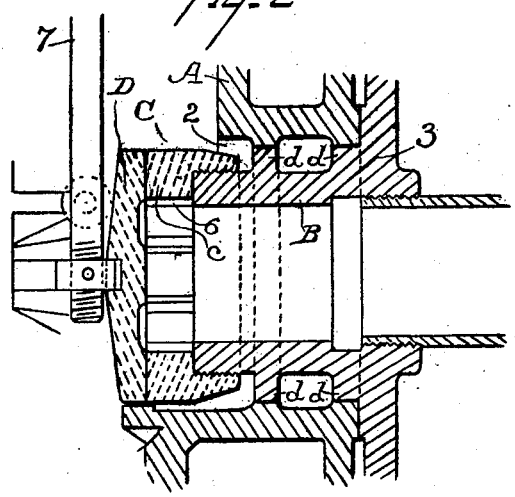
Witnesses,
J. H. Amse
F. A. Bayless
Inventor,
Elijah H. Merrill
By Dewey Strong & Co.
attys
THE NORRIS PETERS CO., PHOTO-LITHO., WASHINGTON, D. C.

UNITED STATES PATENT OFFICE.

ELIJAH H. MERRILL, OF SAN FRANCISCO, CALIFORNIA.

REMOVABLE VALVE-SEAT.

SPECIFICATION forming part of Letters Patent No. 678,014, dated July 9, 1901.

Application filed November 24, 1900. Serial No. 37,606. (No model.)

*To all whom it may concern:*

Be it known that I, ELIJAH H. MERRILL, a citizen of the United States, residing in the city and county of San Francisco, State of California, have invented an Improvement in Removable Valve-Seats; and I hereby declare the following to be a full, clear, and exact description of the same.

My invention relates to improvements in gates or similar devices for the control of the flow of liquids.

It consists of the parts and the constructions and combinations of parts hereinafter described and claimed.

Figure 1 is a vertical section through the valve-casing. Fig. 2 is a similar detail view of seat and its connections. Fig. 3 is a face view of the seat.

It is intended particularly for use in gates controlling the flow of water in which is contained a great deal of sediment and where the wear upon the valve and valve-seat is consequently very great and where it is necessary from time to time to grind down or renew either of the contacting faces of these two parts to prevent leakage.

The object of my invention is to provide a seat that offers a broad bearing or supporting surface for the valve and that is readily removable and replaceable whenever the faces of either it or the valve become so worn as to need redressing or change. Ordinarily the end of the pipe or pipe-section itself is used as a valve-seat, which on account of its thinness soon wears away and it is necessary to take the whole section to be reground, or when it is worn out the whole section must be thrown away, occasioning a considerable loss of metal. By providing a thickened and removable ring on this section regrinding is not so frequently necessary and a new valve-seat can be inserted whenever desired at a small loss of metal in the old seat.

Having reference to the drawings, A represents the casing of a valve-chamber with an opening 2, in which is a short pipe-section B. This section has an annular flange 3, by which it is secured to the casing, as by bolts 4, making a water-tight joint. 5 is the conducting-pipe. Upon the inner end of this section is the valve-seat C, so attached as to be removable when desired. This valve-seat is a ring considerably thicker than the pipe-section and may be screwed upon the outside or the inside of the section B, but leaving a large flange portion c over the end of the section. The interior of the seat is grooved horizontally, as at 6, for the engagement of a key or wrench by which the ring is screwed on or off. A valve D upon a stem 7 slides upon the face of this valve-seat. One object of the thickened flange portion c, aside from the fact of having a surface that will not wear away so rapidly, is to offer a broad support for the valve. With the outflowing water under heavy pressure the strain on the valve as it is moved across the opening in the pipe-section is very great and there is a tendency to vibration, particularly where there is only the thin edge of the pipe or pipe-section serving as a seat. This vibration is entirely obviated and the strain greatly reduced in my device. The opening in the casing A is of a diameter corresponding to the outside diameter of the valve-seat, permitting the ready insertion or removal of the section and seat. In order that these parts may be properly supported, I provide flanges d, which fit the sides of the opening in the casing and which prevent any possible vibration or displacement.

Whenever it is desired to remove and regrind or replace the valve-seat, the bolts 4 are loosened and the pipe-section taken out, the valve-seat unscrewed, and the desired change made, or the valve and valve-seat may be reached and changed by removing the hood a of the casing by means of the bolts 8.

Having thus described my invention, what I claim as new, and desire to secure by Letters Patent, is—

1. The combination with a casing, an opening in this casing, a pipe-section in this opening, means by which this section is removably secured to the casing, a ring fitting the inner end of this section, and having a flange portion of greater thickness than the pipe-section, said flange adapted to extend over the edge of the pipe-section and forming a valve-seat, means by which this ring may be removed from the pipe-section and a valve engaging said valve-seat.

2. The combination with a casing, a pipe-section entering the same and means whereby the pipe-section is detachably secured to the casing, a valve, a ring detachably fitted to the end of the pipe-section and having a flanged face portion of greater diameter than the pipe-section, adapted to extend over the edge of the pipe-section and form a valve-seat and extended bearing, said ring having interior grooves which may be engaged by a tool to detach the ring, and said casing having an opening of sufficient size to admit the pipe-section and its ring.

In witness whereof I have hereunto set my hand.

ELIJAH H. MERRILL.

Witnesses:
S. H. NOURSE,
JESSIE C. BRODIE.